United States Patent [19]

Ohno et al.

[11] Patent Number: 5,247,494
[45] Date of Patent: Sep. 21, 1993

[54] METHOD FOR RECORDING AND REPRODUCING INFORMATION ON AND FROM AN OPTICAL DISK HAVING A READ-ONLY RECORDED ZONE AND A WRITABLE AND READABLE ZONE USING A SPOT LASER LIGHT

[75] Inventors: Eiji Ohno, Neyagawa; Noboru Yamada, Hirakata, both of Japan

[73] Assignee: Matsushita Electric Industrial Co. Ltd., Kodama, Japan

[21] Appl. No.: 497,852

[22] Filed: Mar. 23, 1990

Related U.S. Application Data

[63] Continuation-in-part of Ser. No. 180,938, Apr. 13, 1988, abandoned, which is a continuation-in-part of Ser. No. 742,059, Jun. 6, 1985, abandoned.

[30] Foreign Application Priority Data

Jun. 8, 1984 [JP] Japan ................................ 59-118527

[51] Int. Cl.$^5$ ...................... G11B 13/04; G11B 11/12; G11B 11/10
[52] U.S. Cl. ........................ 369/13; 369/14; 369/47; 369/58; 369/116
[58] Field of Search ........................ 369/14, 13, 47, 48, 369/54, 58, 116; 235/487

[56] References Cited

U.S. PATENT DOCUMENTS

| | | | |
|---|---|---|---|
| 4,451,915 | 5/1984 | LaBudde et al. | 369/275.1 |
| 4,467,383 | 8/1984 | Ohta et al. | 360/131 |
| 4,683,371 | 7/1987 | Drexler | 235/487 |
| 4,688,203 | 8/1987 | Koishi | 369/116 X |

FOREIGN PATENT DOCUMENTS

| | | |
|---|---|---|
| 56-22065 | 5/1981 | Japan . |
| 56-25273 | 8/1981 | Japan . |
| 57-78653 | 5/1982 | Japan . |

*Primary Examiner*—Hoa T. Nguyen
*Attorney, Agent, or Firm*—Cushman, Darby & Cushman

[57] ABSTRACT

An optical disk is provided with a pre-recorded ROM zone and at least one of the write-once zone and an erasable-writable zone. Two types of information are pre-recorded in the ROM zone, including first information for controlling reading from and writing to the non-ROM zone or zones, and second information for use in data information production. Information is recorded and read as localized differences in reflectivity on the disk. A laser used for reading and writing is operated at a first, lower power level for reading and at a second, higher power level for writing. Data information is created using second information read from the ROM zone, and is written to and reproduced from the non-ROM zone or zones.

3 Claims, 5 Drawing Sheets

METHOD FOR RECORDING AND REPRODUCING INFORMATION ON AND FROM AN OPTICAL DISK HAVING A READ-ONLY RECORDED ZONE AND A WRITABLE AND READABLE ZONE USING A SPOT LASER LIGHT

This is a continuation-in-part of application Ser. No. 07/180,938, filed Apr. 13, 1988 (abandoned in favor hereof), which was a continuation-in-part of application Ser. No. 06/742,059, filed Jun. 6, 1985 (abandoned).

FIELD OF THE INVENTION AND RELATED ART STATEMENT

FIELD OF THE INVENTION

This invention relates to an optical information recording and reproducing method for recording with high speed and high density onto an optical information recording member, such as an optical disk, by using laser light.

DESCRIPTION OF THE RELATED ART

Optical disks which record, reproduce, erase and rewrite high density information by using laser light are classified into three types, namely read-only, write-once, record-erase-rewrite-capable (hereinafter is referred to simply as erasable-type).

Read-only-type disks are also called video disks or digital audio disks and so on, and on each, an information signal is recorded on the disk by producing microscopic unevennesses (concave parts and convex parts) on a surface of the disk, thereby to make different light reflectance and to reproduce a signal by directing a light beam onto the surface during high speed rotation of the disk and sensing the light beam as affected by the unevennesses and reflected from the surface. This read-only-type disk has no capability of adding or erasing the signal to or from the disk after the signal has been recorded on the disk, whereas the quality of the signal is high and the signal is preserved semipermanently.

The designation write-once-type disk refers to disks having a capability such that users can add desired additional signals thereto, and this type of disk is used as a still-picture file, a document file, etc., which are already practically used. This type of disk has a low melting-point metal thin film or a thin film made of a low sublimation temperature substance as its recording layer. Pits are formed on its directing onto the recording layer of the disk surface by a laser light beam modulated by signals, or by changing an optical characteristic (refractivity or extinction coefficient) of the recording layer by emanation of a modulated laser light beam, and by tracing with the laser light beam on the recording layer to produce signals as differences of reflectance or transmittance. Though the signals cannot be rewritten, this type of disk can record a large quantity of information at a high speed and also can reproduce a large quantity of information at the same high speed, and furthermore its characteristic of being able to store recorded signals for more than several tens of years has been reported.

The erasable-type disk, which has functions of erasing and rewriting, is provided by using as a recording medium a thin layer of, for instance, a chalcogenide glass thin film or Te-Ge-Sn-O thin film (that is, a thin film made by adding a low amount of Ge or Sn to a TeO$_x$ composition of Te and TeO$_2$), which has such a characteristic the composition thereof becomes stabilized, so as to have a small reflectance when its temperature has been elevated to a temperature which is greater than the melting point of the composition, by laser light beam irradiation, and thereafter rapidly cooled. The composition also becomes stabilized with a high reflectance when its temperature has been elevated to a temperature which is greater than the crystallization temperature of the composition, by laser light beam irradiation, or has been elevated to a temperature which is greater than the melting point of the composition by laser light beam irradiation, and thereafter slowly cooled. This type of information storage disk is expected to have the variety of usage of a conventional optical disk, but in view of its characteristic of erasability, security for storage of the recorded signal is not assured.

Although optical disks have many varieties and have been utilized in various fields, and still more uses are being sought, usage of such conventional information storage disks is generally limited, since a conventional information storage disk usually has only one kind of recording zone. One proposal for extending the range of utility by combining two kinds of information storage media is disclosed in Japanese Patent Examined Published Application Sho 56-22065. The disk as disclosed in that publication has a first zone of low sublimation temperature substance and another zone of ferromagnetic substance, both in thin films formed on different parts of the same glass disk or cylinder. The first zone is used as a write-once-type of information storage disk to provide a totally fixed memory similar to the aforementioned write-once-type optical disk, and the second zone is used as an erasable-type memory similar to that of a conventional erasable magneto-optical disk, thus providing a combined usage of both types of memories.

Even though the above-mentioned Japanese prior art proposes a new usage having two different kinds of memory zones, it has the following problems when configuration of the apparatus in which the disk is used and processing speed of the information are considered.

The first problem of the prior art is that the recording and reproducing devices for the first and the second recording zones cannot be a single common device. That is, the recording and reproducing of the thin film of the low sublimation temperature substance are made by using an optical means such as a laser beam-emitting device and a photoelectric device to pick up the light reflected by the thin film, whereas recording of the second information storage zone made of the thin film of ferromagnetic substance is made by utilizing rotation of the polarization plane of the reflected light beam by utilizing the magnetic Kerr effect or Faraday effect, thereby to detect small spots of the reversed magnetizations. Recording, erasing and rewriting require the application of a bias magnetic field besides the optical means. Accordingly, the prior art requires at least two optical heads of different optical configurations from each other, and hence, two control mechanisms therefor. With regard to magneto-optical recording in the second information storing zone, a magnetic device to apply the magnetic field is required, thereby making the apparatus very complicated.

Furthermore, since the recording characteristics of the two zones are very different from each other, in the case of a compact laser device, such as a semiconductor laser, the output power of which is limited, if one is used in the recording apparatus, it is sometimes difficult to record the information in two kinds of zones utilizing the same rotation speed and the same laser output power. Therefore, very high speed signal processing has been difficult.

U.S. Pat. No. 4,467,383 or the Japanese unexamined patent publication (Tokkai) Sho 57-78653 discloses a method in which signals are recorded on one optical disk through two kinds of recording principles to thereby realize both an erasable-type recording and a write-once-type recording. In U.S. Pat. No. 4,467,383, an erasable-type recording is realized using a magneto-optic recording method, and write-once-type recording is realized using an irreversible recording method in which the temperature of the same thin recording film is raised up to the crystallization temperature to thereby become crystallized and change the transmittance of the recording film. In Sho 57-78653, erasable-type recording is realized using a magneto-optical recording method, and write-once-type recording is realized by an irreversible recording method that a hall is formed in the same thin recording film by raising its temperature to a temperature which is higher than the melting point or the sublimation point.

In both the above-mentioned methods, reproduction of the recorded signal is carried out in similar way to the above-mentioned method taught by Sho 56-22065. That is, erasable-type recording is realized by a magneto-optical recording utilizing magnetic Kerr effect or Faraday effect, and write-once-type recording is realized by an irreversible recording method utilizing the fact that reflected light quantity varies in response to change of reflectance, or transmitted light quantity varies in response to change of transmittance. Therefore, means for detecting rotation of the plane of polarization in the reflected light or the transmitted light and means for detecting change of the reflected light quantity or the transmitted light quantity are both necessary for the optical head. Moreover, it is required in a magneto-optical recording to supply magnetic field from the outside at the time of recording. As a result, the recording/reproducing apparatus becomes complicated.

Further, the following recording method is proposed in IBM Technical Disclosure Bulletin (Vol. 25 No. 2 Jul. 1982). The erasable region is made of a magnetic recording medium and the write-once region is made of an optical recording medium; recording in the magnetic recording medium is carried out by a magnetic head, and recording in the optical recording medium is carried out by an optical head. In this method, however, means for realizing both magnetic recording and optical recording is necessary, thereby rendering the recording/reproducing apparatus complicated.

SUMMARY OF THE INVENTION

An object of the present invention is to remove the above-mentioned shortcomings of the prior art and to offer an improved information recording, reproducing or erasing method on an optical disk having plural kinds of zones, which has wide scope of usage, without necessitating use of a complicated configuration of a head for recording, reproducing and erasing, and to offer a controlling mechanism therefore.

In order to achieve the above-mentioned object, the present invention provides an information recording/reproducing method implemented on an optical disk having a first recording zone of read-only type from which pre-recorded information is reproduced by an optical head connected to a control circuit, and second recording zone on which information is to be recorded by the optical head, the recording and reproducing being carried out by directing onto the second recording zone a beam from a laser light with respective predetermined intensities from the optical head, the reproducing being carried out by detecting changes in the quantity of reflected light over all the recording zones. In a preferred implementation, the method comprises:

An optical disk is provided with a pre-recorded ROM zone and at least one of the write-once zone and an erasable-writable zone. Two types of information are pre-recorded in the ROM zone, including first information for controlling reading from and writing to the non-ROM zone or zones, and second information for use in data information production. Information is recorded and read as localized differences in reflectivity on the disk. A laser used for reading and writing is operated at a first, lower power level for reading and at a second, higher power level for writing. Data information is created using second information read from the ROM zone, and is written to and reproduced from the non-ROM zone or zones.

The above-mentioned method enhances the usefulness of optical disks, without necessitating the use of a complicated head configuration and complicated head control system for recording, reproducing and erasing.

DESCRIPTION OF THE PREFERRED EMBODIMENT

Figure 1:
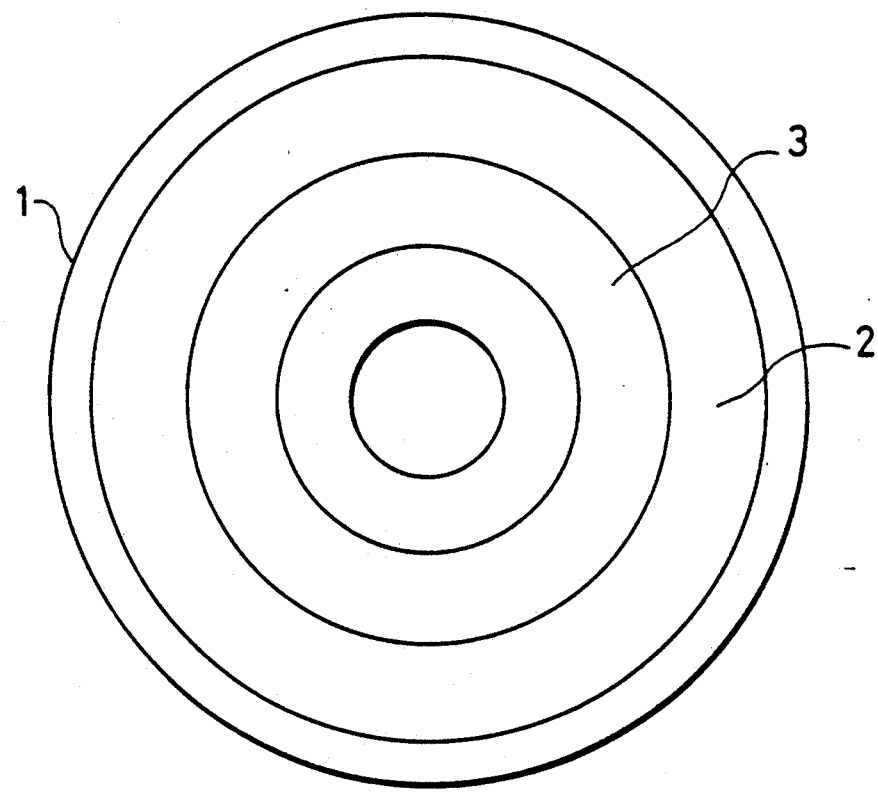
FIG. 1 is a top plan view showing an optical disk used in the process of the present invention.
Figure 2:
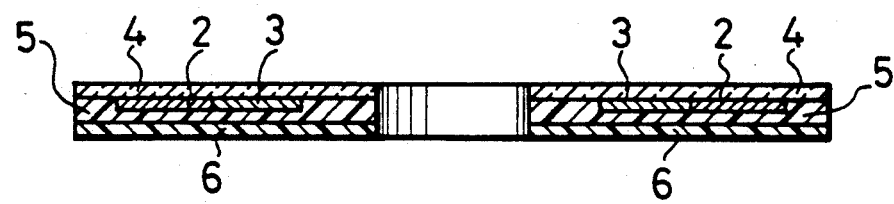
FIG. 2 is a longitudinal cross-sectional view of the optical disk of FIG. 1.

FIG. 1 shows one embodiment of the optical disk 1 used for practicing the method of the present invention and FIG. 2 shows a longitudinal cross-sectional view of the optical disk 1.

The substrate 4 is made of quartz, pyrex, soda glass, etc., or resin, for example, ABS resin, polystyrene, acrylic acid resin, polycarbonate, polyvinyl chloride, etc. A first recording zone 2 and a second recording zone 3 are both made of a thin representative layer recording medium and both are arranged for recording information. The recording zones 2 and 3 are different from each other in their characteristics, that is, the recording zone 2 is of a read-only type which does not have recording and erasing functions, and the recording zone 3 is of a write-once type which does not have an erasing capability, or of an erasable type which has both erasing and recording capabilities.

In the read-only type recording zone 2, information signals are recorded by causing these to be microscopic unevennesses on the surface of the optical disk, and thereafter metal thin film is formed on the unevennesses in order to improve reflectance. Therefore, the recording zone 2 has no capability that signals can be recorded or erased after completion of an initial recording. However, the initial recorded signals will be stored, and therefore readable semipermanently. Reproduction of the recorded signals is carried out by detecting differences of reflectance in the microscopic unevennesses on the disk upon irradiation of a surface of the metal film by the laser light.

The write-once type recording zone 3 is a thin layer which is formed on a surface of the substrate 4 and has a low melting point or a low sublimation point. The recording or writing process is to write by heat-deforming the thin layer by irradiating the surface using a light beam of a laser. Alternatively, the write-once type recording 3 is a $TeO_x$ thin film layer which is a composition of Te and $TeO_2$, a $TeO_x$-Au thin film layer made by adding Au to $TeO_x$, a $TeO_x$-Pd thin film layer made by adding Pd to $TeO_x$, a $Sb_2Te_3$ thin film layer or an $Sb_2Se_3$ thin film layer, etc. The writing process is to irradiate the thin film using a pulse light beam of a laser, followed by heating and cooling, thereby to change the refractivity and extinction coefficient of the irradiated part of the thin film, and to vary irreversibly the reflectance of the irradiated part.

Alternatively, if the second zone 3 is an erasable-type recording zone rather than a write-once-type recording zone, the erasable-type recording zone 3 is a thin $TeO_x$-based layer, for example, Te-Ge-Sn-O or Te-Ge-Sn-Au-O, or a thin Te-based chalcogenide glass layer, for example, Te-Ge-Sn-Au, Te-Ge-Se-Sb, $Te_{81}Ge_{15}Sb_2S_2$ or $Te_{60}Se_{20}Ge_{20}$. Recording and reproducing of signals are executed by utilizing such reversible variation of reflectance that when temperature of the recording film rises above the melting point, due to irradiation of the laser light beam and is thereafter rapidly cooled, the irradiated part is stabilized with a small reflectance, and also when temperature of the recording film rises above the crystallization temperature or rises above the melting point, due to irradiation of the laser light beam and is thereafter slowly cooled, the irradiated part is stabilized with a large reflectance.

Reproduction of signals, from the second zone 3, regardless of whether it is a write-once-type recording zone or a erasable-type recording zone, is carried out by detecting changes in the reflected light quantity of the irradiated laser light as reflected from the second zone. This change is caused by changes of the refractivity and extinction coefficient in the recording film. Therefore, in both the read-only-type zone 2 and the write-once-type or the erasable-type recording zone 3, signals can be reproduced by the same method. As a result, there is a great advantage that all signal data recorded on this optical disk are reproducible by a single optical head, which can detect changes in the reflected light quantity, irrespective of the types of the recording zones.

Figure 3:
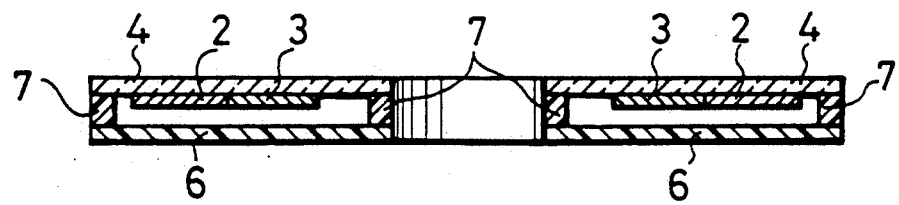
FIG. 3 is a longitudinal cross-sectional view of another optical disk useful in practicing the method of the present invention.

Apart from the above-mentioned embodiment of FIG. 2, wherein the substrate 4 having the recording zones 2, 3 is fixed to a protecting cover 6 by an adhesion 5, in another embodiment shown in FIG. 3, the adhesion 5 can be eliminated therefrom by using a spacer 7 to make a hollow construction.

Figure 5:
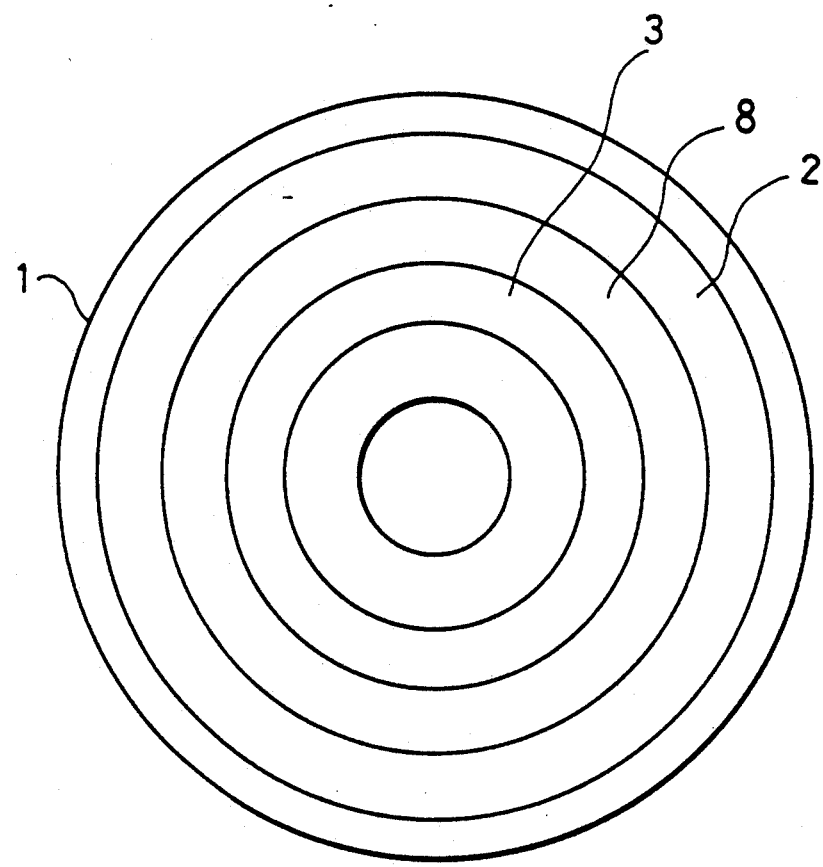
FIG. 5 is a top plan view of another optical disk useful in practicing the method of the present invention.

FIG. 5 is a plan view of another optical disk 1 used in the present invention. This optical disk 1 has a read-only zone 2, an write-once-type recording zone 8 and a erasable-type recording zone 3.

As mentioned above, the write-once-type recording zone cannot be erased or rewritten but has superior weather resistance, and therefore is suitable for long-term storage of a recording signal. Therefore, it is easy to record information classified into information which is to be stored for a long time and information which is to be stored for a short time or to be amended.

Since reproduction of signals from the read-only-type zone 2, the write-once-type zone 8 and the erasable-type zone 3 is realized by a common method, in which changes in the reflected light quantity of the irradiated laser light are detected, there is also a great advantage that all signal data recorded on this optical disk are reproducible by a single optical head, which can detect changes in the reflected light quantity, irrespective of any of the recording zones.

Further, for an optical disk having three zones which is constituted by a read-only-type zone, a write-once-type zone and a erasable zone, the present inventors have found that recording power levels for the write-once-type zone and the erasable-type zone can be made nearly equal to each other by making an optimum combination of the recording materials used for both zones, and that therefore selection of the laser light power is made easily.

Next, optimum recording conditions for combining the write-once-type recording zone and the erasable-type recording zone are described. The inventors have measured recording characteristics of optical disks which are made of various recording films. An optical disk is made by evaporating a film-forming material and condensing it onto a substrate, so as to provide on the substrate a recording film having a thickness of 1000 angstroms. As the substrate, there may be used a polycarbonate substrate having a diameter of 130 mm. In the erasable-type recording zone, a $SIO_2$ layer having a thickness of 1000 angstroms is provided on and under the recording film so as not to become damaged by heat which is generated by repeated recording and erasing. Linear velocity, which means relative velocity between the optical disk and the spot where the laser beam which writes to the disk intersects a respective zone of the disk, is always kept a constant 5 m/s, and the frequency of the recording signals is 1.5 MHz. In the write-once-type recording zone, the recording signals are recorded directly on the recording zone which is in an as-deposited state, but, in the erasable-type recording zone, after crystallization of the recording film, the recording signals are recorded by irradiating the spot on the respective zone with laser light to thereby form a recording mark of amorphous recording medium.

Figure 4:
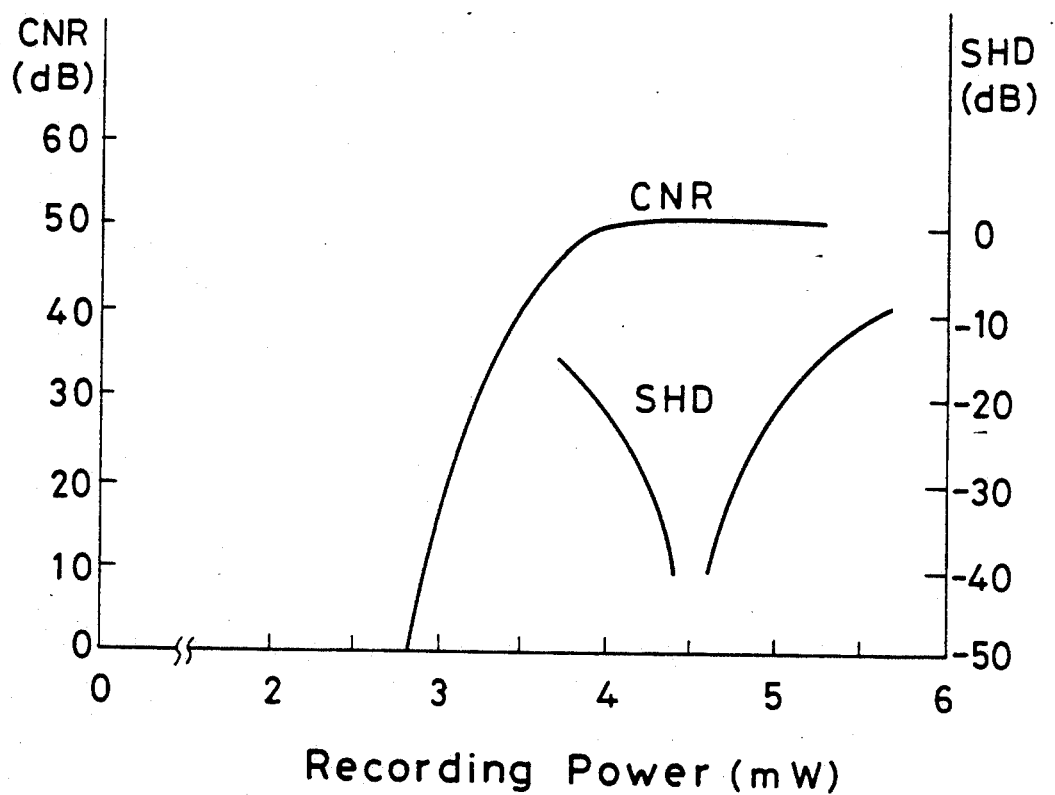
FIG. 4 is a graphic representation of a recording characteristic of a write-once-type optical disk provided with a $TeO_x$ film.

As an example, how to obtain an optimum recording condition using $TeO_x$ in a write-once-type recording zone is described. Carrier-to-noise ratio (hereinafter referred to as CNR) and second order harmonic distortion (hereinafter referred to as SHD) are measured by changing the recording power. As shown in FIG. 4, CNR is saturated from about 4 mW. And, SHD becomes minimum at 4.5 mW, which shows that distortion of reproduced waveform of signals recorded by the recording power of 4.5 mW is minimum. Therefore, the optimum recording power on $TeO_x$ recording medium is 4.5 mW.

The following Table 1 and Table 2, show the optimum recording powers for the write-once-type and the erasable-type, recording zones respectively.

TABLE 1

| composite of recording film | optimum recording power (mW) |
|---|---|
| Te | 6.5 |
| Bi | 6.2 |
| $TeO_x$ | 4.5 |
| $TeO_x$—Au | 4.6 |
| $TeO_x$—Pd | 4.9 |
| $Sb_2Se_3$ | 5.8 |

TABLE 2

| composite of recording film | optimum recording power (mW) |
|---|---|
| Te—Ge—Sn—O | 5.0 |
| Te—Ge—Sn—Au | 4.9 |
| Te—Ge—Sn—Au—O | 5.2 |
| Te—Ge—Se—Sb | 5.3 |
| Te—Se—Ge | 6.4 |

Detailed compositions of the above are as follows:
$TeO_x$ is $Te_{48}O_{52}$
$TeO_x$—Au is $Te_{50}Au_5O_{45}$
$TeO_x$—PD is $Te_{50}Pd_5O_{45}$
Te—Ge—Sn—O is $Te_{40}Ge_5Sn_{10}Au_{45}$
Te—Ge—Sn—Au is $Te_{60}Ge_5Sn_{10}Au_{25}$
Te—Ge—Sn—Au—O is $Te_{60}Ge_5Sn_{10}Au_5O_{20}$
Te—Ge—Se—Sb is $Te_{45}Ge_{10}Se_{10}Sb_{35}$
Te—Se—Ge is $Te_{60}Se_{20}Ge_{20}$ In Table 1, as for Te or Bi, the recording signals are recorded by irradiating laser light onto the recording medium to thereby make small holes in the recording film. As for the others, the recording signals are recorded by utilizing the phase transition from amorphous to crystalline state, in the recording medium.

Therefore, when both the write-once-type recording zone 8 and the erasable-type recording zone 3 are made of such types of thin recording layers that are recorded with a signal by utilizing variation of optical density, the recording and reproducing characteristics, i.e., recording and reproducing power, can be almost equal to each other in both recording zones 8 and 3.

For instance, when one member selected from the group consisting of thin layers based on $TeO_x$, for example, $TeO_x$ thin layer (4.5 mW), $TeO_x$-Au thin layer (4.6 mW) and $TeO_x$-Pd thin layer (4.9 mW) as a material of the write-once-type recording zone 8, and one member selected from the group consisting of chalcogenide glass thin layer based on Te and such thin layer based on $TeO_x$, for example, Te-Ge-Sn-O thin layer (5.0 mW), Te-Ge-Sn-Au thin layer (4.9 mW) or Te-Ge-Sn-Au-O thin layer (5.2 mW), it is easy to select the necessary laser power for recording to be of the same level for both the write-once-type recording zone 8 and the erasable-type recording zone 3, by slight adjustment of the composition of the recording thin film. Therefore, in a recording and reproducing apparatus, it is possible to set the power level of the laser for recording in the same way as onto an apparatus for recording in a disk having only one kind of recording zone.

When the number of rotations of an optical disk per unit time is constant, the further out a track is, from the center of the disk the faster the relative velocity between a laser spot and the optical disk becomes. In processes of recording, reproducing and erasing on the optical disk, recording and erasing require a large power for the laser light. Reproducing is carried out using only small power. Accordingly, a preferable arrangement is that the read-only-type zone is disposed in an outermost track and the write-once-type zone or the erasable zone is disposed in an inner track. This arrangement contributes to reducing the laser power required for the recording/reproducing apparatus, and price of the apparatus is thereby reduced.

Although the above-mentioned optical disk of the exemplary preferred embodiment has three recording zones having different recording characteristics, it can have more than three recording zones, which collectively comprise a read-only-type zone and at least one recording zone of write-once-type or one recording zone of erasable type.

Figure 6:
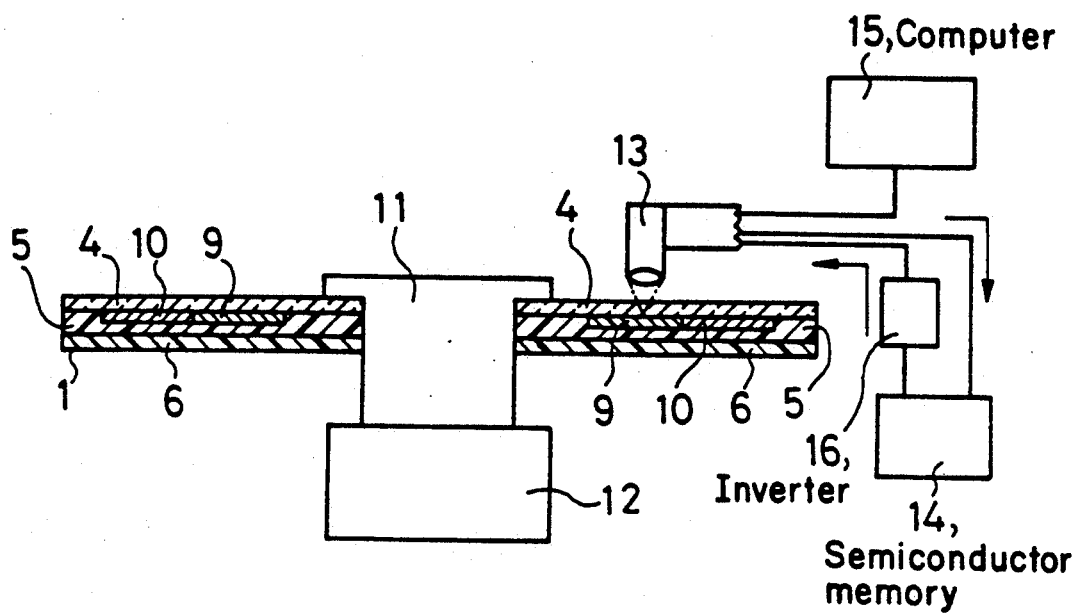
FIG. 6 is a longitudinal cross-sectional view of a recording and reproducing apparatus using an optical disk in practicing the method of the present invention.

An example of a recording and reproducing apparatus using the optical disk is provided in the following:

In FIG. 6, a write-once-type recording zone 10 of a recording disk 1 is made of a thin layer of $TeO_x$ ($x \approx 1.1$) composition of Te and $TeO_2$. The write-once-type recording zone 10 has superior signal storage characteristics, thereby being suitable for long-time, stable signal storage. The recording of the write-once-type recording zone 10 is executed by irradiating a spot on the zone using a pulsed light beam of a laser, thereby to increase the reflectance at respective sites which coincided with the spot when the laser beam was pulsed on, by heating and subsequently cooling.

The recording zone 9 is a thin film of Te-Sn-Ge-O. The recording zone 9 has a capability of being rewritten, but, on the other hand, the signal storage characteristics thereof are weaker than that off the $TeO_x$ ($x \approx 1.1$) thin film. The recording utilizes the reversible change of reflectance of the Te-Sn-Ge-O thin layer. That is, the reflectance is stabilized in a lower reflectance state by heating by the pulse laser irradiation followed by quick cooling, and is stabilized in a higher reflectance state by laser heating followed by slow cooling. For recording a signal, it is preferable to utilize the small reflectance condition caused by the heating followed by the quick cooling since it can realize a high speed recording. This is contrary to the case of the write-once-type $TeO_x$ ($x \approx 1.1$) which records a signal in a large reflectance condition.

However, it is easy to set the level of the laser power for recording and reproducing on the recording zone 9 to be the same as that of $TeO_x$ of the recording zone 10. Therefore, with regard to the laser power level, it is not necessary to consider the difference of the recording zone characteristics on the recording zone 9 and recording zone 10. Accordingly, the setting of the level of the laser power for recording and reproducing on one disk is easy, similarly to the case of the disk having only one recording zone.

The above-mentioned recording zones 9, 10 are formed on the substrate 4 and covered with the protecting cover 6 via the adhesion 5 as in the embodiment of FIG. 2.

A disk of such construction is supported by a spindle 11 and rotated by a known motor 12.

Details of an embodiment in which an optical disk having the above-mentioned two kinds of recording characteristics is used for a data file system is described hereafter. First, all data issued from a computer 15, are recorded on the rewritable recording zone 9 by an optical head 13. Second, among the recorded data, such data which are important and should be recorded for a long time are reproduced or read out by the optical head 13 and are memorized in a semiconductor memory 14. Such data memorized in the semiconductor memory 14 are reversed with regard to its "0", "1" logic of a binary system by an inverter 16 and recorded on the write-once recording zone 10 by the optical head 13. The reason why the inverter 16 is utilized is that it is necessary to make a correspondence such that parts of lower reflectance than surrounding parts should correspond to "1" and the parts of higher reflectance than surrounding parts should correspond to "0" on the whole recording zones, since, in the rewriting recording zone 9, the recording bit is maintained having a lower reflectance than surrounding parts, but write-once recording zone 10, the recording bit is maintained having a higher reflectance than surrounding parts. Data on the recording zone 9 are erased when they become unnecessary, and next output data are recorded on the recording zone 9 from the computer. According to the above-mentioned procedures, the output data from the computer can be easily edited and filed, thereby enabling storage for a long time, by utilizing only one optical disk of the embodiment.

Another embodiment of the present invention utilizing an optical disk will be described with reference to FIG. 7.

Figure 7:
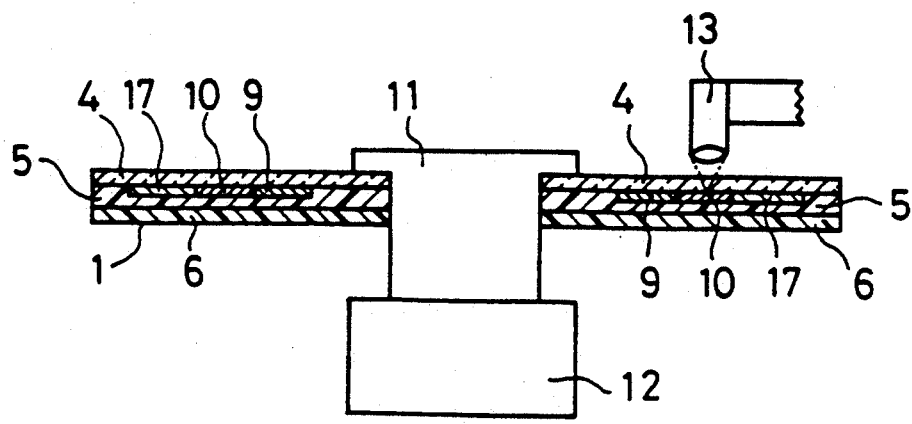
FIG. 7 is also a longitudinal cross-sectional view of recording and reproducing apparatus using an optical disk in practicing the method of the present invention.

In FIG. 7, the recording zone 9 is an erasable-type Te-Sn-Ge-O thin layer similar to that of the recording zone 9 of the above-mentioned embodiment. The recording zone 10 is a $TeO_x$ ($x \approx 1.1$) thin layer which is similar to that of the recording zone 10 of the above-mentioned embodiment and has superior storage characteristics of recorded signal, for thereby realizing a long, stable signal storage. The further recording zone 17 is a recording zone of the read-only type and is made by preliminarily forming unevennesses corresponding to data of signals on the surface of the disk, and the unevennesses being coated by a reflection layer of aluminum. The method of using the optical disk, of FIG. 7 having the above-mentioned three kinds of recording characteristics as a ROM and a back-up memory of a word processor, is as follows:

In the Japanese written language, Kanji (Chinese characters) are used beside Hiragana letters, which correspond to an alphabet, or syllabary. In a Japanese language word processor, the Hiragana letters are allotted to keys of a keyboard. However, since Kanji includes several thousand characters, it is impossible to allot them to the several decade keys. Accordingly, as for each Kanji character and its compound words (Kanji phrase), the operator inputs its reading to the keyboard by using the Hiragana letters whose sounds when pronounced phonetically correspond to that particular Kanji character or compound (among others, which are homonyms). Based on the reading, the word processor searches the desired Kanji or Kanji phrase and thereafter converts the Hiragana letters into the Kanji or Kanji phrase through the operator's selection (from among homonyms). Therefore, the word processor requires a ROM or the back-up memory in which the Kanji and Kanji phrases are stored, as in a dictionary.

First, when the disk is manufactured, fundamental idioms which seem to be essential for the word processor are preliminarily recorded on the recording zone 17 and the disk is offered to a user. The user records other necessary idioms on the recording zone 10, using the optical head 13, and thereby increases the number of Hiragana-to-Kanji matches in the vocabulary which have been stored, thus increasing the usefulness of the disk as a word-processing dictionary. Some documents which seem to be frequently used also by the user are recorded and stored on the recording zone 9 by the optical head 13. Since the recording zone 9 is capable of erasing and rewriting, unnecessary documents can be erased or amended partly, and thereby re-recording of new documents is possible, thus all the memory which is necessary for the word processor is available on a single optical disk.

Incidentally, since both the recording bits on the recording zone 9 and the recording zone 17 are maintained in the lower reflectance parts (compared with the surrounding parts in the same zone) and the recording bits in the recording zone 10 are maintained in the higher reflectance parts (compared with the surrounding parts in the same zone), the signal which is to be recorded on the recording zone 10 is recorded by the optical head 13, after being reversed with regard to its logical "0" and "1" of the binary system, by utilizing the inverter 16 as in the above-mentioned embodiment, in order to cause the lower reflectance parts (compared to the surrounding parts in the same zone) correspond to binary ones and the higher reflectance parts (corresponding to the surrounding parts in the same zone) correspond to the binary zeros on the whole of recording zones 9, 10 and 17.

Figure 8:
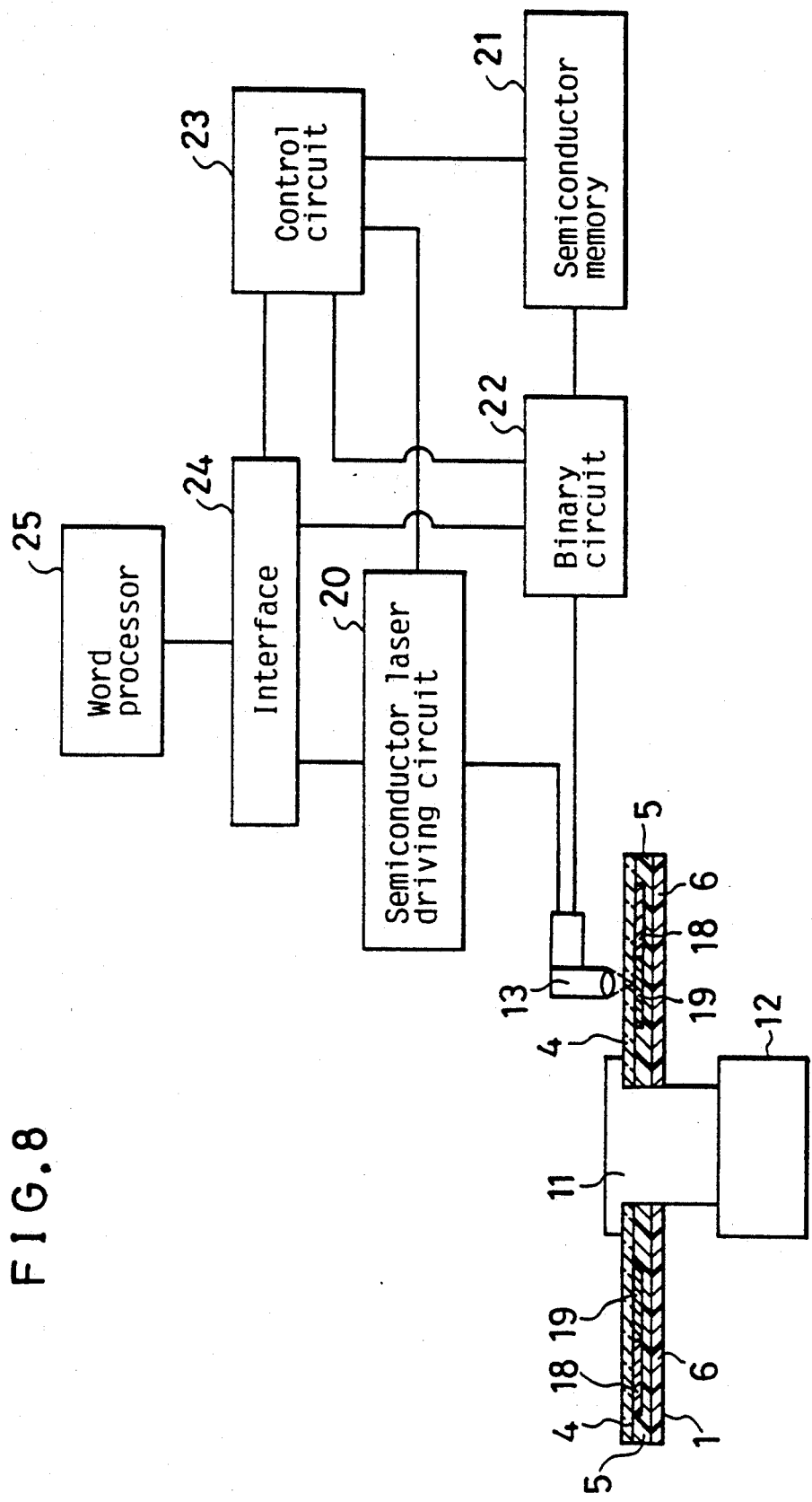
FIG. 8 is a combined longitudinal cross-sectional and schematic illustration showing a longitudinal cross-sectional view of the optical disk and a peripheral circuit diagram therefor, useful in practicing the method of the present invention.

FIG. 8 is a combined illustration showing a cross-sectional view of the optical disk and a peripheral circuit diagram therefor. Hereafter, an example of a method of the present invention, for information recording, reproducing and erasing is described.

In FIG. 8, the recording zone 19 of the optical disk 1 is of erasable type, e.g., of a thin film of Te-Sb-Ge. This thin film makes a reversible phase-transition from amorphous to crystalline by receiving the laser light irradiation. That is, when the temperature of an amorphous part of the thin film is raised by irradiating it using a laser light to thereby raise its temperature to a temperature which is greater than the crystallization temperature, the amorphous part becomes crystallized. When temperature of the thin film is raised to a temperature which is greater than the melting point and the thin film is thereafter rapidly cooled, the corresponding portion of the thin film becomes amorphous. Therefore, information signals are recorded by modulating the laser light power from the crystallization power to the melting point power in response to the signals to be recorded. Since the reflectance of the crystallized state is higher than that of the amorphous state, signals are reproduced by detecting differences of reflectance against the laser light.

The recording zone 18 is of read-only type. Information for operating the optical disk 1 is preliminarily recorded by making unevennesses on a substrate and thereafter forming a light-reflective layer. The light-reflective layer is made of a metal or semi-metal thin film which increases the reflectance of the substrate. For instance, a thin film of Al or Au is used, or the same recording film as that of the recording zone 19 can be also used. In this embodiment, a thin film of Te-Sb-Ge, which is the same film as that of the recording zone 19, is used.

The above-mentioned optical disk is utilized for an external memory of a computer or word processor. Hereafter, information processing procedures in the word processor are described.

In fabricating the optical disk, information for operating the optical disk is recorded preliminarily in the read-only-type zone; for instance, information (i.e. first pre-recorded information) about track regions of the read-only-type zone and the erasable-type zone, and about the laser light power for recording signals in the erasable-type zone and other information (i.e., second pre-recorded information) such as in a dictionary, including a vocabulary and idiomatic phases is recorded. The optical disk having the above-mentioned predetermined information is processed as follows:

First, the optical disk 1 is mounted onto the spindle 11 and is rotated by the motor 12. Next, laser light is irradiated from the optical head 13, onto a spot in the read-only zone on the disk and information in the read-only-type zone 18 is thereby detected through change of reflectance. Further, this information is stored in a semiconductor memory 21, by means of a binary circuit 22. Based on this stored information, such operational conditions for the recording apparatus as the laser light power or a recording area of signal are controlled by a control circuit 23. The optical head 13 gains access to predetermined positions on the optical disk 1 in accordance with detected address signals or sector signals provided on the optical disk 1. Control of the laser light power is carried out by varying the current which flows in a semiconductor laser mounted in the optical head 13, from a semiconductor laser-driving circuit 20. The currents required in the semiconductor laser at the time of recording, erasing or reproducing are selected in the control circuit 23.

The optical head 13 basically includes the semiconductor laser, lenses for focusing the laser light into a spot having a diameter of about 1 $\mu$m on the optical disk 1 and a photodetector for detecting the reflected light from the optical disk 1. In the reproducing process, the spot on the optical disk 1 is irradiated by laser light power of, e.g., 1 mW, and changes in the reflected light quantity are detected.

Since the read-only type zone 18 has recorded thereon information, such as the dictionary of the word processor, this information is sent to the word processor 25 in case of need. Signals reproduced by the optical head 13 are supplied to the word processor 25 through the binary circuit 22 and an interface 24.

In case a document file (i.e., data information) made by the word processor 25 is recorded on the optical disk 1, the optical head 13 gains access to a position where the information is to be recorded in accordance with the information stored in the semiconductor memory 21. At that time, the laser light power from the optical head 13 is made high. Since the laser light power is modulated between the crystallization power and the melting power in response to the signals to be recorded, old and unnecessary information is erased and new information is simultaneously recorded.

In case a document file recorded in the erasable-type zone 19 is to be reproduced, the erasable-type zone 19 is irradiated by the optical head 13 with low laser light power which is weakened to a substantially equal level to that for the read-only-type zone 18, and change of the reflectance is detected. Since each recording mark is in an amorphous state, reflectance thereof is lower than from a peripheral part. This is the same state as that the recording mark on the read-only-type zone 18 has a lower reflectance than that of the peripheral part thereof. Therefore, reproduction can be made by the same method as that of the read-only-type zone 18. That is, as for reproduction of signals, it is a great advantage that all signal data on the whole zones of the optical disk 1 are reproduced only by one optical head 13 and the same method.

According to the present invention, recording onto the erasable-type zone 19 and reproduction from the erasable-type zone 19 and the read-only-type zone 18 are both realized by a single optical head 13. Further, information which is necessary for the word processor is offered on an optical disk, and data of the inputted document can be also recorded on the same optical disk. Thus, application fields of the optical disk 1 are expanded without rendering the optical head or the recording/reproducing apparatus complicated. For example, the optical disk 1 can be used for a computer data file memory which needs to have editing procedures and a long storage, the aforementioned word processor memory which need to be provided on ROM and provide a backup capability.

We claim:

1. A method for recording information on and reproducing information from an optical disk which has a first, read-only-type recording zone containing first and second pre-recorded information recorded as microscopic unevennesses readable by an optical head having a laser which is responsive to a drive circuit that is controlled by a control circuit, and at least a second, writable recording zone which is capable of being written upon at least once, for recording bits of information thereon using said optical head, said method comprising:

(a) reproducing information from said first pre-recorded information recorded in said first, read-only-type recording zone by irradiating a spot of about one micron in diameter on said first, read-only-type recording zone with laser light from said optical head at a first, lower power level, detecting changes in quantity of light reflected from said spot as said disk is moved relative to said head, and storing said detected changes in light intensity in memory external to said disk as detected information;

(b) as a result of conducting step (a), providing said control circuit for said drive circuit with an operational condition with regard to where said optical head is to read from and write to said optical disk, respectively using said first, lower power level and a second, higher power level for said laser;

(c) thereafter, reproducing information from said second pre-recorded information recorded in said first, read-only-type recording zone by irradiating a spot of about one micron in diameter on said first, read-only-type recording zone with laser light from said optical head at said first, lower power level by using said optical head as driven by said drive circuit under control of said control circuit having said operational condition for detecting changes in quantity of light reflected from said spot as said disk is moved relative to said head;

(d) thereafter, creating data information utilizing said information reproduced from said second pre-recorded information;

(e) thereafter, recording said data information onto said second, writable recording zone as bits of information by irradiating a spot of about one micron in diameter on said second, writable recording zone with laser light from said optical head at said second, higher power level by using said optical head as driven by said drive circuit under control of said control circuit having said operational condition to provide changes in quantity of light irradiated onto said disk at said spot as said disk is moved relative to said head, and thereby provide localized changes in light reflectivity on said disk; and (f) thereafter, reproducing said data information from said second, writable recording zone by irradiating a spot of about one micron in diameter on said second, writable recording zone with laser light from said optical head as driven by said drive circuit under control of said control circuit having said operational condition for detecting changes in quantity of light reflected from said spot as said disk is moved relative to said head.

2. The method of claim 1, wherein:
in conducting step (e), said localized changes in light reflectivity are permanently made.

3. The method of claim 1, wherein:
in conducting step (e), said localized changes in light reflectivity are rewritably made, and said method further comprises:

(g) erasing at least some of said data information recorded in step (e) and thereafter repeating steps (e) and (f).

* * * * *